US010496987B2

(12) United States Patent
Zhang

(10) Patent No.: US 10,496,987 B2
(45) Date of Patent: Dec. 3, 2019

(54) CONTAINERIZATION OF NETWORK SERVICES

(71) Applicant: Verizon Patent and Licensing Inc., Arlington, VA (US)

(72) Inventor: Fengping Zhang, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 517 days.

(21) Appl. No.: 15/263,893

(22) Filed: Sep. 13, 2016

(65) Prior Publication Data
US 2018/0075152 A1 Mar. 15, 2018

(51) Int. Cl.
G06F 17/00 (2019.01)
G06Q 20/40 (2012.01)
G06F 9/50 (2006.01)
H04L 29/06 (2006.01)
G06F 8/61 (2018.01)
G06F 9/455 (2018.01)
H04L 29/08 (2006.01)
G06Q 20/14 (2012.01)
G06Q 20/16 (2012.01)
G06F 16/188 (2019.01)
G06F 16/27 (2019.01)

(52) U.S. Cl.
CPC .............. *G06Q 20/40* (2013.01); *G06F 8/63* (2013.01); *G06F 9/455* (2013.01); *G06F 9/5083* (2013.01); *G06F 16/196* (2019.01); *G06Q 20/145* (2013.01); *G06Q 20/16* (2013.01); *H04L 63/062* (2013.01); *H04L 63/126* (2013.01); *H04L 67/34* (2013.01); *G06F 16/27* (2019.01); *H04L 67/10* (2013.01)

(58) Field of Classification Search
CPC .......... G06Q 20/40; G06F 16/196; G06F 8/63
USPC ...................................................... 235/375
See application file for complete search history.

(56) References Cited

U.S. PATENT DOCUMENTS

2016/0274928 A1* 9/2016 Linton ................ G06F 9/45558
2017/0264684 A1* 9/2017 Spillane ............. H04L 67/1095
2017/0277524 A1* 9/2017 Bhat ......................... G06F 8/60
2017/0373940 A1* 12/2017 Shahab .................. H04L 41/12

* cited by examiner

Primary Examiner — Karl D Frech

(57) ABSTRACT

Techniques, described herein, may enable network services to be efficiently and effectively implemented as containers by computing devices operating in a cloud computing environment. Container images may be built and tested locally by an operator device and pushed to the computing devices for deployment of containers defined by the container images. The computing devices may enable the containers to communicate with one another by applying a domain name service (DNS) and port mapping tool to the containers. The computing devices may provide data collection, data search, and data visualization tools to enable an operator to monitor and manage the containers themselves as well as the activity of the containers.

20 Claims, 9 Drawing Sheets

CONTAINERIZATION OF NETWORK SERVICES

BACKGROUND

Owning and operating a network may involve providing a wide range of network services. Examples of such services may include providing authentication and authorization services, monitoring network performance, managing network resources, tracking network usage, implementing charging policies, and more. Providing network services may involve installing and maintaining appropriate software (e.g., software capable of providing the network services) on servers operating in a cloud computing environment.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1:
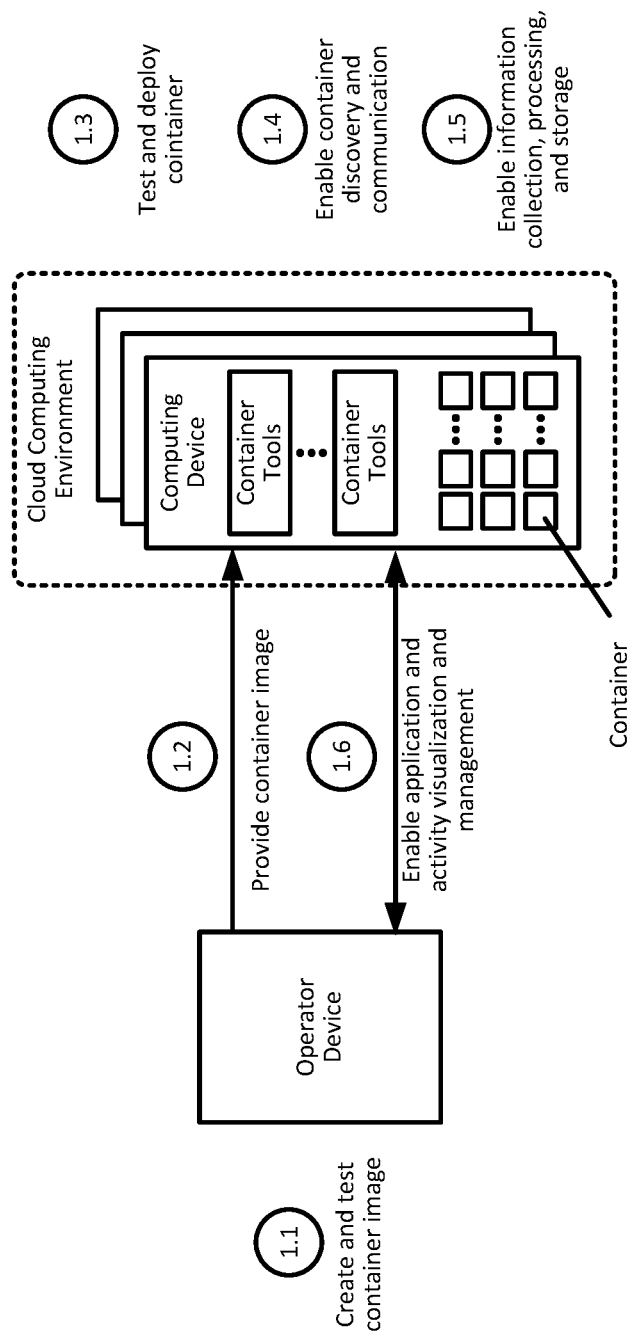
FIG. 1 illustrates an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Containers may be used to deploy software applications in a cloud computing environment. A container may include a complete runtime environment for a piece of software, including an application, plus application dependencies, libraries and other binaries, and configuration files to run the application, all bundled into one package. Since a container may already provide a complete runtime environment for an application, containers may enable applications to run on operating systems with configurations that might otherwise be incompatible with a standalone instance of the application. Additionally, unlike virtual machines (VMs), where each VM often includes an operating system, one or more applications, virtualized hardware components, etc., a container may be limited to system tools and features that are not already running on the host computer. As a result, utilizing containers may increase the performance of host servers by reducing the resources (processing capacity, memory, etc.) used to host the applications.

While containers may provide certain benefits, there may be certain drawbacks to using containers to implement network services. For instance, some containerization techniques may not provide for specifying appropriate deployment environments for different types of containers. Meanwhile, applications for distinct network services may vary greatly in terms of size, complexity, and preferred deployment conditions. Some applications may benefit from significant allocations of system resources (e.g., processor capacity, memory capacity, etc.), while such allocations for other applications may be wasteful.

Additionally, some containerization techniques may not enable containers to automatically discover and communicate with one another. However, many network services include a relatively high degree of interactivity with other networks services. An output of one network service may often be an input used by one or more other network services. As such, implementing network services via containers may be greatly facilitated by providing an effective way for containers to discover and communicate with one another.

Furthermore, when managing a complex network that provides a lot of network services, being able to thoroughly monitor the network and network activity is often a critical part of ensuring that the network continues to operate as intended. However, some containerization techniques do not provide an adequate way to monitor containers and activity corresponding to the containers. Using such techniques to containerize network services would likely be problematic due to a lack of network monitoring and oversight capabilities.

Techniques, described herein, may enable network services to be implemented as containers in a manner that is effective and efficient, that provides for customized deployment conditions, that enables containers to communicate with one another, and that enables information regarding the containers to be collected, processed, searched, and presented to an operator. An operator device may create a container image that may include executable instructions for creating a container. The operator device may execute the container image to create and test a local instance of the container. The operator device may provide the container image to computing devices that are part of a cloud computing environment. The computing devices may execute the container image to create and test an instance of the container in the cloud computing environment. The computing devices may deploy the container in a customized manner based on instructions received from the operator device.

The computing devices may enable deployed containers to communicate with one another by assigning names to the containers, registering the names with a domain name service (DNS), and mapping ports of the containers and the computing devices throughout the cloud. Each container may include a data forwarding component that may automatically collect information about the container (e.g., identification and activity information) and forward the information to a designated repository. The computing devices may process the information (e.g., filter, parse, index, etc.) for storage in a search engine that may also be provided by the computing devices. The information may be presented to an operator as a visual representation of the current state and activity of the containers deployed in the cloud.

FIG. 1 illustrates an example overview of an implementation described herein. As shown, an operator device (e.g., a laptop computer, a desktop computer, etc.) may create and test container images (at 1.1). A container image may include a read-only data structure that includes executable instructions for creating an instance of a container defined by the container image. The container image may include an application identifier, application dependency information, an application group or network service to which the application corresponds. The operator device may test the container image locally by creating an instance of the container defined by the container image. Creating and testing the container image locally may enable an operator to determine whether the container image operates correctly and/or whether changes to the container image are warranted.

The container image may be communicated to a computing device (also referred to herein as a "node") that may be part of a cloud computing environment that includes multiple computing devices (at 1.2). The computing device may include one or more container tools that may enable the computing device to operate in a manner described herein. For example, the computing device may test and deploy a container defined by the container image (at 1.3). In some implementations, the computing device may also receive instructions about how the container should be deployed (e.g., how many instances of the container should be created, the manner in which the containers should be distributed (e.g., load-balanced) across the computing devices, the system resource (e.g., processor capacity, memory, etc.) that should be used to host the container, etc.).

Additionally, the computing device may enable containers to discover and communicate with one another (at 1.4). In some implementations, this may be done by assigning domain names to the containers, mapping ports of the containers and/or the computing devices, and making a DNS available to the containers. The computing device may enable information about the containers to be collected, processed, and stored by a search engine hosted by one or more of the computing devices (at 1.5). Doing so may enable an operator to communicate with the computing device in order to visualize and manage the containers and activity corresponding to the containers (at 1.6).

Figure 2:
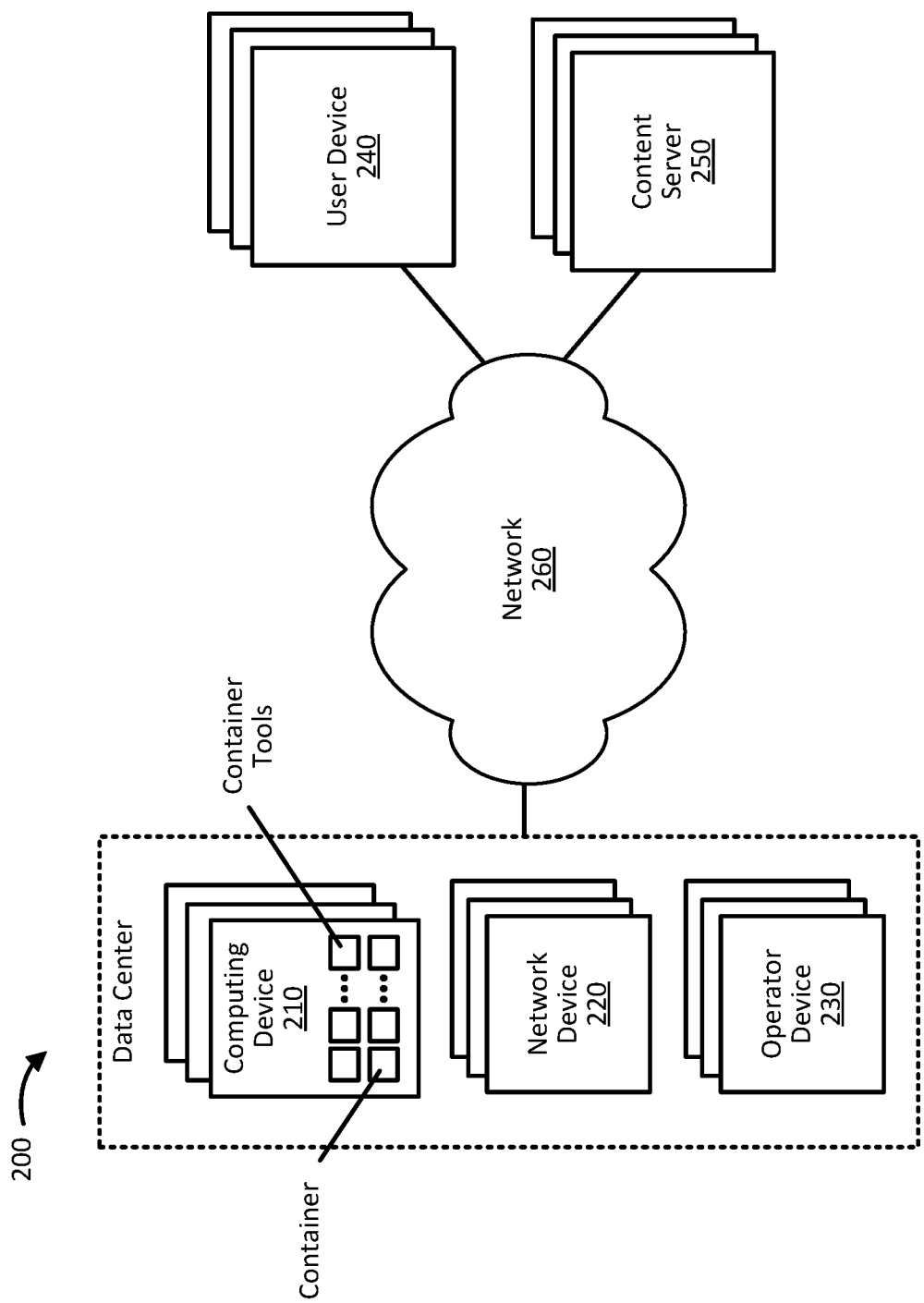
FIG. 2 is a diagram of an example environment in which systems and/or methods described herein may be implemented.

FIG. 2 is a diagram of an example environment 200 in which systems and/or methods described herein may be implemented. Environment 200 may include a data center that includes one or more computing devices 210, network devices 220, and operator devices 230, in addition to user devices 240, external devices 250, and network 260.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another device of environment 200. Additionally, the devices of environment 200 may interconnect with each other, and/or other devices, via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

Computing device 210 may include one or more computing devices, such as a server device or a collection of server devices, capable of operating in a cloud computing environment. For example, computing device 210 may include an operating system and/or other software (e.g., container tools) that enable computing device 210 to perform one or more of the operations describe herein. Examples of container tools are discussed in detail below with reference to FIG. 3. Examples of the operations performed by computing device 210 may include testing and deploying containers, enabling the containers to discover and communicate with one another, collecting information regarding the containers, providing the information to an operator, etc. In some implementations, containers may be organized into logical groups that collectively provide one or more network services.

Examples of such network services may include: 1) an Internet services platform that may allocate network resources to different kinds of services provided over Hypertext Transfer Protocol (HTTP) and HTTP Secure (HTTPS) flows; and 2) a toll free data service (TFDS) that may cause content providers to be charged for network resources used to provide content to a content consumer. Additional examples of such services may include a key management service (KMS) used to create, store, and distribute security keys for services to sign and/or verify Uniform Resource Identifiers (URIs) of content.

Network device 220 may include one or more devices that facilitate or enable communications between various devices shown in environment 200 (e.g., computing devices 210 and operator devices 230). Examples of network device 220 may include routers, modems, gateways, switches, hubs, etc. Network devices 220 may be arranged and configured to interconnect the computing devices 210 and operator devices 230 in one or more ways, in addition to providing a connection between the data center and network 260.

Operator device 230 may include a computing and communication terminal. In some implementations, operator device 230 may include a portable device, such as a smart phone, a laptop computer, a tablet computer, etc. Operator device 230 may also include non-portable computing devices, such as a desktop computer, a consumer or business appliance, or other devices that have the ability to connect to network 260. Operator device 230 may also include a computing and communication device that may be worn by a user (also referred to as wearable devices) as a watch, a fitness band, a necklace, glasses, an eyeglass, a ring, a belt, a headset, or another type of wearable device. While operator device 230 is depicted in FIG. 2 as being part of the data center, in some implementations, operator device 230 may be located outside of the data center and may communicate with the data center via network 260.

Operator device 230 may perform one or more of the operations described herein, such as creating a container image locally and testing the container image by generate an instance of a container defined by the container image. Additionally, or alternatively, operator device 230 may communicate with computing device 210 to configure how, and what types of, information is collected by the container tools of computing device 210. Operator device 230 may also submit query requests regarding the information collected, processed, and stored by the container tools and may receive the requested information from the container tools. In some implementations, operator device 230 may receive a visual representation describing the containers that are currently deployed, the manner in which the containers are grouped and otherwise interrelate, and/or activity information corresponding to each of the containers.

User device 240 may include a computing and communication terminal operated by an end user. In some implementations, user device 240 may include a portable device, such as a smart phone, a laptop computer, a tablet computer, etc. User device 240 may also include non-portable computing devices, such as a desktop computer, a consumer or business appliance, or other devices that have the ability to connect to network 260. User device 240 may also include a computing and communication device that may be worn by a user (also referred to as wearable devices) as a watch, a fitness band, a necklace, glasses, an eyeglass, a ring, a belt, a headset, or another type of wearable device. In some implementations, user device 240 may request and receive content from content server 250 via network 260. In some implementations, communications between user device 240 and content servers 250 may involve one or more of the network services that are implemented by the containers hosted by computing device 210.

Content servers 250 may include one or more computing devices, such as a server device or a collection of server devices, capable of providing content (e.g., images, audio, video) to user device 210 via network 260. In some implementations, content server 250 may be owned or operated by a content provider, which may include a company, an organization, or and individual that uploads media content to content servers 250 and makes the media content available for download and/or streaming. In some implementations, the content provider may be signed up for one or more of the network services provided by the containers of computing device 210. Examples of such services may include a TFDS that enables the content provider to pay for the network resources and services required to provide content to user device 210.

Network 260 may include one or more wired and/or wireless networks. For example, network 260 may include a cellular network (e.g., a second generation (2G) network, a third generation (3G) network, a fourth generation (4G) network, a fifth generation (5G) network, a Long-Term Evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 260 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

Figure 3:
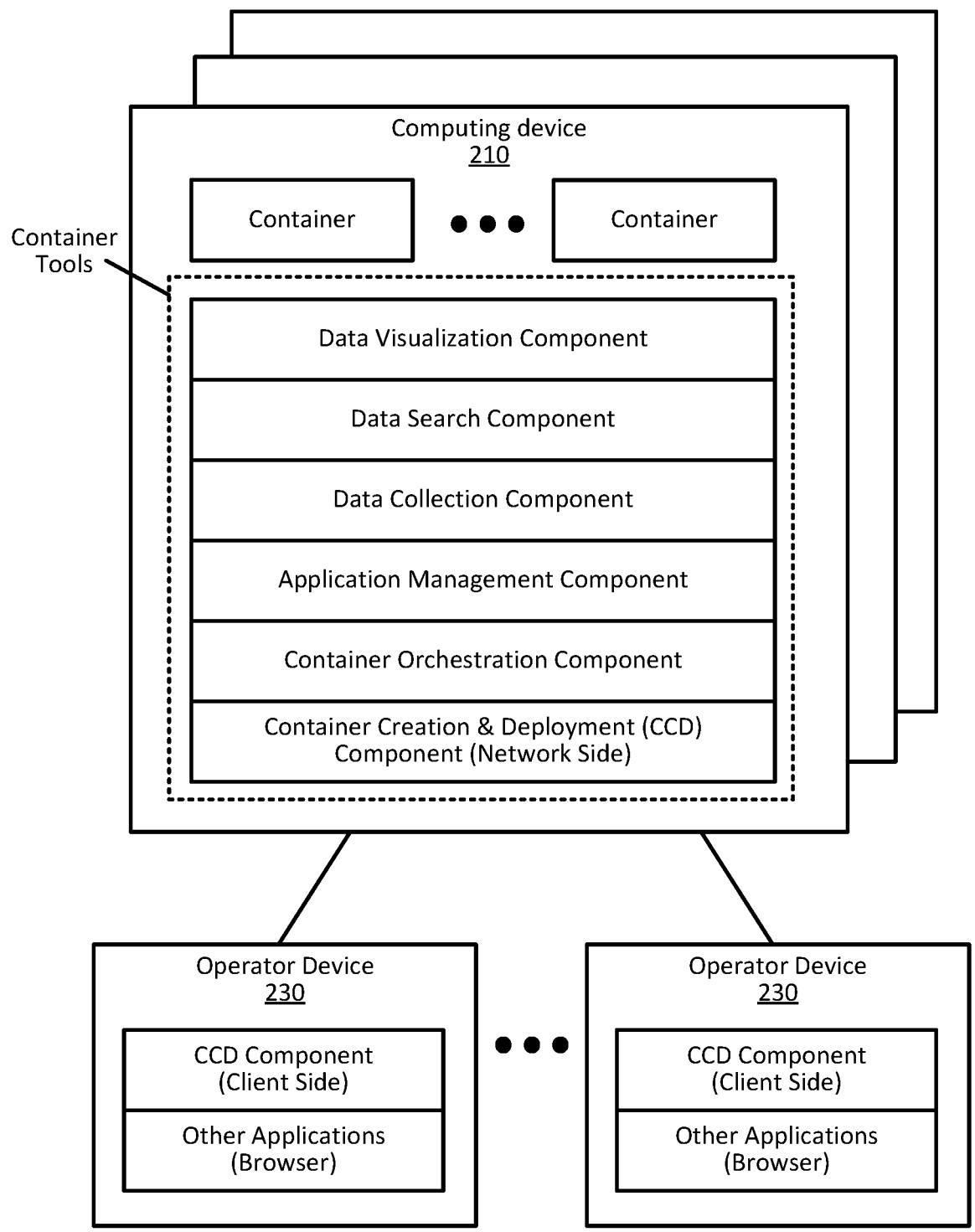
FIG. 3 is a diagram of an example of computer devices and operator devices.

FIG. 3 is a diagram of an example of computing device 210 and operator devices 230. As shown, computer devices 210 may include containers and one or more container tools, such as a data visualization component, a data search component, a data collection component, an application management component, a container orchestration component, and a container creation and deployment (CCD) component. Operator devices 230 may include CCD component and other applications, such as a browser (which may be used to communicate with computing device 210). The components described in FIG. 3 may include software applications, platforms, and frameworks that may be implemented in combination with system resources (e.g., processing capacity, memory capacity, storage capacity, etc.) of computing device 210 and/or operator device 230.

The CCD component of operator device 230 may enable an operator to create a container image that may be used to create a container. The container image may be created using a container file that may include a set of instructions for building the container image. Examples of such instructions may include: 1) instructions to designate a base image from which the container image is created; 2) instructions to designate a particular operator as the author of the container image; 3) instructions to add files or directories (e.g., application dependencies) to the container image; and 4) a run command to execute one or more instructions to create the container image.

Additional examples of such instructions may include: 1) instructions to set default commands and/or parameters for the container image (which may be overwritten when the container image is run); 2) instructions to configure a container image to run as an executable; 3) instructions to set environment variables for the container image; and 4) instructions to inform the CCD component of the ports to which the container may listen. The CCD component of operator device 230 may execute the instructions of the container file to create a container image. The CCD component may also test the container image by creating a local instance of the container corresponding to the container image. The CCD component may push the container image to the CCD component of computing device 210.

The CCD component of computing device 210 may store the container image in a repository. The CCD component may test the container image in a cloud computing environment (as opposed to the local environment of operator device 230), and if/when the container image is approved, may deploy the container image in the cloud computing environment. Testing and/or deploying a container image may include creating one or more instance of a container according to the instructions found in the container image itself or another instruction received from operator device 230.

In some implementations, the CCD component may test and/or deploy the container image in response to a request to do so from an operator. For example, the operator of operator device 230 may use a browser to access an interface of the container orchestration component, and use the interface to provide the CCD component with a command to test and deploy the container image. In some implementations, the CCD component of operator device 230 and the CCD component of the computing device 210 may include a Docker platform, while the container file and the container image may include a DockerFile and a Docker Image, respectively.

The container orchestration component may include an application programming interface (API) that may enable an operator of operator device 230 to access the container orchestration component via a browser (or some other suitable application). In some implementations, the operator may use the interface to verify that a container image has been received by the computing device 210, to upload instructions about how a container image should be tested and deployed, to verify that the container image has been properly deployed, etc. The container orchestration component may also be used to view how containers have been distributed (e.g. load-balanced) across multiple computing device 210 and (when applicable) cause the containers to be redistributed more appropriately. In some implementations, the container orchestration component may include a Marathon software platform and/or a datacenter operating system (DCOS).

The application management component may be used to manage computing devices 210 and/or containers deployed on computing devices 210. The application management component may be capable of providing granular-level resource isolation, allocation, and sharing capabilities across computing devices 210, software frameworks, and/or containers. The application management component may help ensure that hardware and software resources are used efficiently in a complex, distributed, and rapidly changing network. In some implementations, the application management component may include Apache Mesos.

Additionally, in some implementations, when a container is created and deployed, a DNS tool of the application management component may determine and register a name and address for the container. The name may be determined using a pre-selected naming convention that involves a combination of container (or application) attributes. For instance, the name may include an application identifier, a marathon name, and an indication of the application management component (e.g., <appID>.<marathon-name>.mesos). In an implementation that involves a KMS application, the marathon platform, and the DNS tool of Apache Mesos, the name of the container may include: kms.marathon-service.mesos.

In some implementations, the application management component may map container ports to host ports (e.g., ports of computing device 210), which in turn may be mapped to service ports across the computing devices 210 of the data center. By registering domain names with the DNS tool and mapping port numbers throughout the cloud computing environment, the application management component may enable containers to communicate with one another regardless of how they may be distributed across the computing devices 210.

The data collection component may include a tool for collecting and processing information from containers. In some implementations, each container may include a forwarding tool that collects and forwards information to a repository of the data collection component. The information may include an identification and description of the container and logs, events, etc., corresponding to container activity. The data collection component may use parsing tools, filters, or data enrichment and conversion techniques to process the raw information into a form that is more germane to being stored, indexed, searched, and analyzed. In some implementations, the application management component may include the Logstach platform.

The data search component may include a software product that includes data collection, storage, indexing, and search engine capabilities. Similar to the other components of computing device 210, the data search component may be readily scalable and highly distributable across multiple computing devices 210. Each computing device 210 may participate in coordinating and delegating search operations, distribution rebalancing, routing information between computing devices 210, etc. The data search component may be capable of searching many types of documents by reducing different file formats (e.g., PDF, HTML, DOC, etc.) to documents that include fields of text. The data search component may be accessible via a HTTP web interface and schema-free JavaScript Object Notation (JSON) documents. In some implementations, the data search component may include Elasticsearch.

The data visualization component may include a centralized visualization tool for viewing service data, such as logs, events, etc. The data visualization component may provide an interface through which a user may submit requests and queries for information collected and stored by the data storage component. The data visualization component may receive information (from the data storage component) in response to such requests, and may provide the information to the operator. Examples of such information may include a visual representation of the containers that are currently deployed, the manner in which the containers are related to one another (e.g., grouped according to network service), whether the containers appear to be operating properly, and information describing the activities of each of the container. In some implementations, the data visualization component may include an analytics and search dashboard, such as Kibana.

Figure 4:
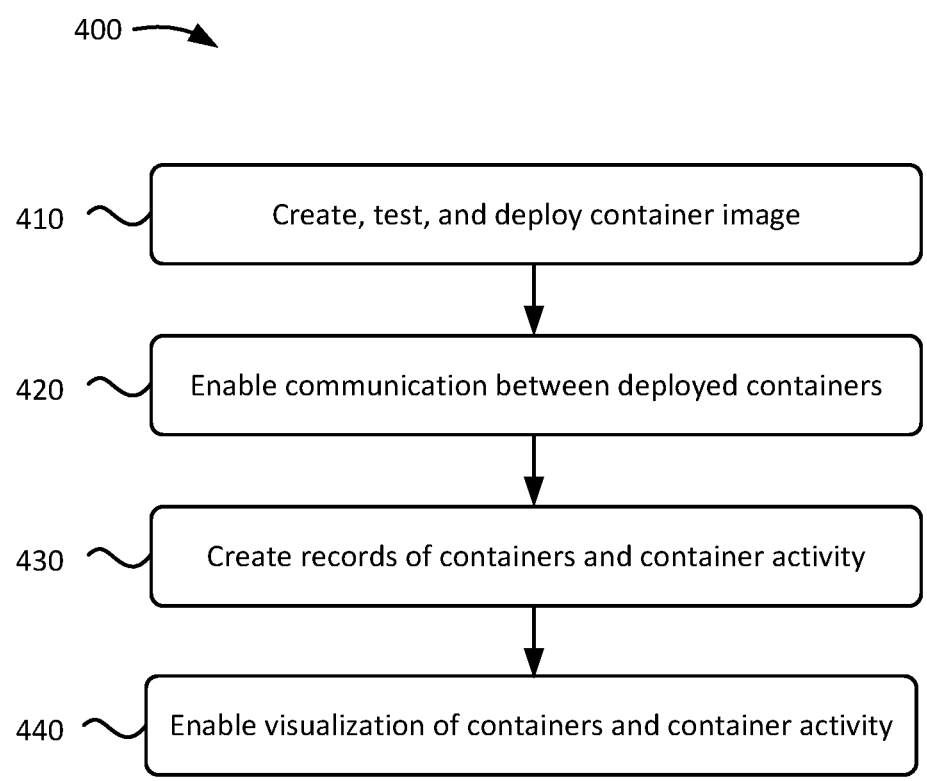
FIG. 4 is a diagram of an example process for container creation, deployment, and management.

FIG. 4 is a diagram of an example process 400 for container creation, deployment, and management. In some implementations, process 400 may be implemented by computing device 210 and/or operator device 230. For example, some of the operations of FIG. 4 are described below as being performed by operator device 230. However, in some implementations, such operations may instead by performed by computing device 210 (which may involve an operator accessing computing device 210 via operator device 230 remotely). The operations of FIG. 4 are described below with periodic reference to FIGS. 5-7.

As shown, process 400 may include creating, testing, and deploying a container image (block 410). For example, operator device 230 may create a data structure that includes instructions for building an instance of a container. The container image may be a read-only data structure to better ensure that the data structure is not inadvertently modified during the creation, testing, and deployment process described herein. Additionally, or alternatively, since the container image may only reference the application that is to be containerized (as opposed to including a complete copy of the application), the container image may reduce the resources that are used to communicate and store container images.

Figure 5:
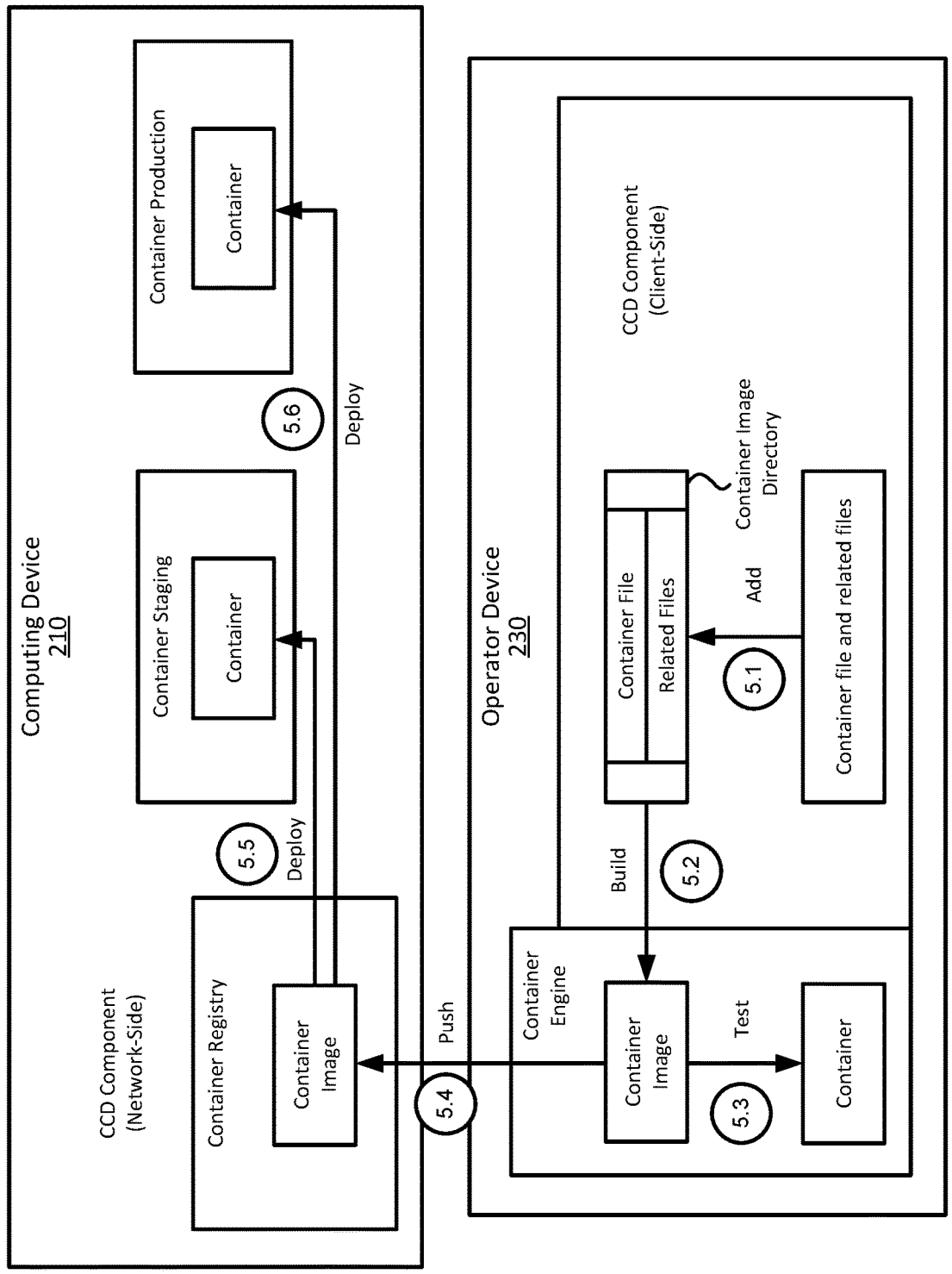
FIG. 5 is a diagram of an example implementation for creating a container image and deploying a container.

FIG. 5 is a diagram of an example implementation for creating a container image and deploying a container. As shown, operator device 230 may create a container image directory and add a container file and one or more related files (e.g., dependencies) to a container image directory (at 5.1). An example of a container file may include a Docker file. The container file may include sets of successive instructions for building a container image (e.g., a docker image) one layer at a time. For instance, the container file may include a first set of instructions for creating an initial (or base) image, a second set of instructions to modify the initial image in a particular way, followed by another set of instructions to modify that image, and so on. The final product may include a container image.

The related files may include information for running an application with the container and deploying the container within the proper environment (e.g., the proper server environment). Examples of such information may include a file describing a context in which the container should be deployed, an application (e.g., a directory where the application is located, an identifier corresponding to the application, etc.) that is to run within the container, configuration data for the application, instructions for containerizing the application within the container of the container file, and instructions for deploying the container within the proper context.

Operator device 230 may use a container engine to create a container image based on the information in the container image directory (at 5.2). As mentioned above, the container image may include a read-only data structure that includes information for creating a container, configuring the container in a particular way, and deploying the container within a particular environment. Operator device 230 may also, or alternatively, use the container engine to test the container image by creating a local instance of the container and performing one or more tests on the container (at 5.3). Testing the container image may help ensure that the container image functions as intended and is ready to be pushed to a container registry of computing device 210 (at 5.4). In some implementations, the container registry may include a repository server for storing and distributing container images among computing devices 210.

Operator device 230 may cause the container image to be deployed to a container staging component of computing device 210 (at 5.5). The container staging component may enable the container image to be tested in a safe cloud computing environment. The operator device 230 may also, or alternatively, cause the contain image to be deployed to a container production component of computing device 210 (at 5.6). The container production component may cause the container image to be executed, such that an instance of the container (defined by the container image) is actually deployed. In some implementations, the container images, deployment of the container images, and management of container, may be enabled by container orchestration platform, such as Marathon, which may be accessed to an operator, via operator device.

In some implementations, the deployment of the container image to the container staging component and/or the container production component may be controlled by a deployment descriptor file provided to computing device 210 by operator device 230. The deployment descriptor file may describe system resources (e.g., processor capacity, memory capacity, etc.) that should be used by computing device 210 to implement the container. The deployment descriptor file may also, or alternatively, include a number of container instances that should be created, an identifier of the application of the container, configuration information for the container, etc. The deployment descriptor file may be provided to computing device 210 at any time before the container image is deployed by computing device 210 (such as when the container image is pushed to the container registry). In some implementations, the deployment descriptor file may be included in the container image.

Referring again to FIG. 4, example process 400 may include enabling communication between deployed containers (block 420). For instance, computing device 210 may apply a container naming and mapping technique to some or all of the containers of a particular network service and/or network environment (which may include multiple network services). The container naming and mapping technique may enable each container to which it is applied to automatically discover one another and to begin communicating with one another in a manner that is consistent with providing the network service(s) for which the container is intended. In some implementations, computing device 210 may use a DNS tool to assign a domain and address to each container. Additionally, computing device 210 may map container ports of the containers, ports of computing devices 210, and/or service ports across computing devices 210. The assigned addresses and mapped ports may enable the containers to communicate with one another.

Figure 6:
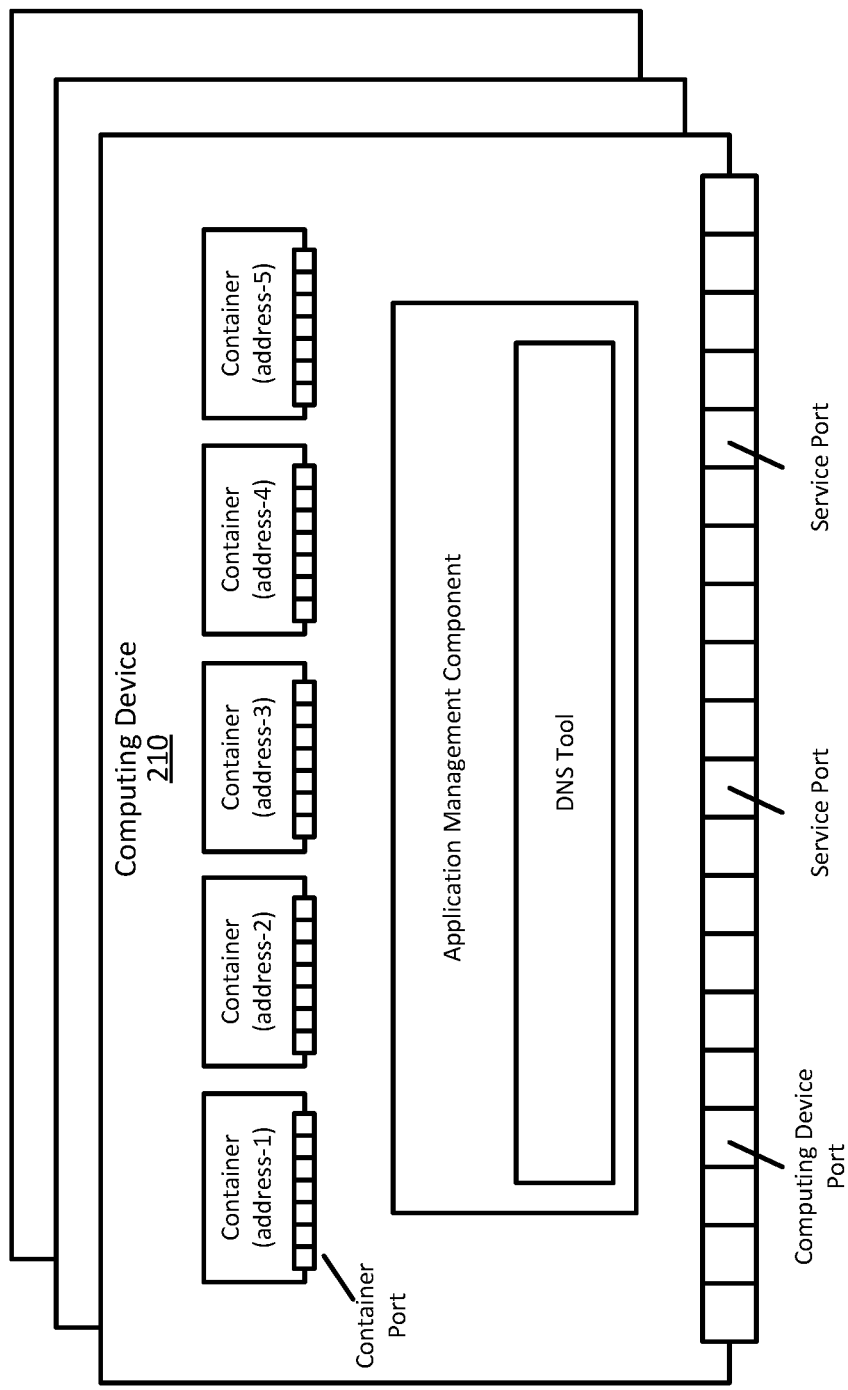
FIG. 6 is a diagram of an example implementation for enabling communications between deployed containers.

FIG. 6 is a diagram of an example implementation for enabling communications between containers. As shown, computing device 210 may include an application management component that may include a DNS tool. An example of the application management component and the DNS tool may include am Apache Mesos and Mesos-DNS, respectively. When containers are deployed, the application management component may enable the containers to communicate with one another. For example, the application management component may register an address and/or name for each container. Additionally, the application management component may map container ports to host ports (e.g., ports of computing device 210), which may in turn be mapped to a service port across multiple computing devices 210. As such, the containers may communicate with one another using the addresses assigned to the containers.

Returning to FIG. 4, process 400 may include creating records of containers and container activity (block 430). For example, computing device 210 may include a data collection component that collects information corresponding to containers that are deployed across computing devices 210. The information may include an identifier of each container, one or more groups to which each container corresponds, an address and port number of each container, a time and date when the container was deployed, a network service to which each container corresponds, an operator that originated the container, etc. Computing device 210 may also collect information describing activity that corresponds to the containers. Examples of such information may include information that is sent or received by each container, processes and operations performed by each operation, a time and date when each container was last active, log and event data generated by each container, etc.

Process 400 may also include enabling visualization of container and of container activity (block 440). For example, computing device 210 may be capable of storing information about each container and about activity corresponding to each container. Computing device 210 may also provide an interface through which an operator may receive a visual representation of the containers and/or a visual representation of the activity of the containers. In some implementations, the interface may also enable an operator to submit query requests regarding the information collected by computing device 210, make changes to the manner in which the information is collected, etc.

Figure 7:
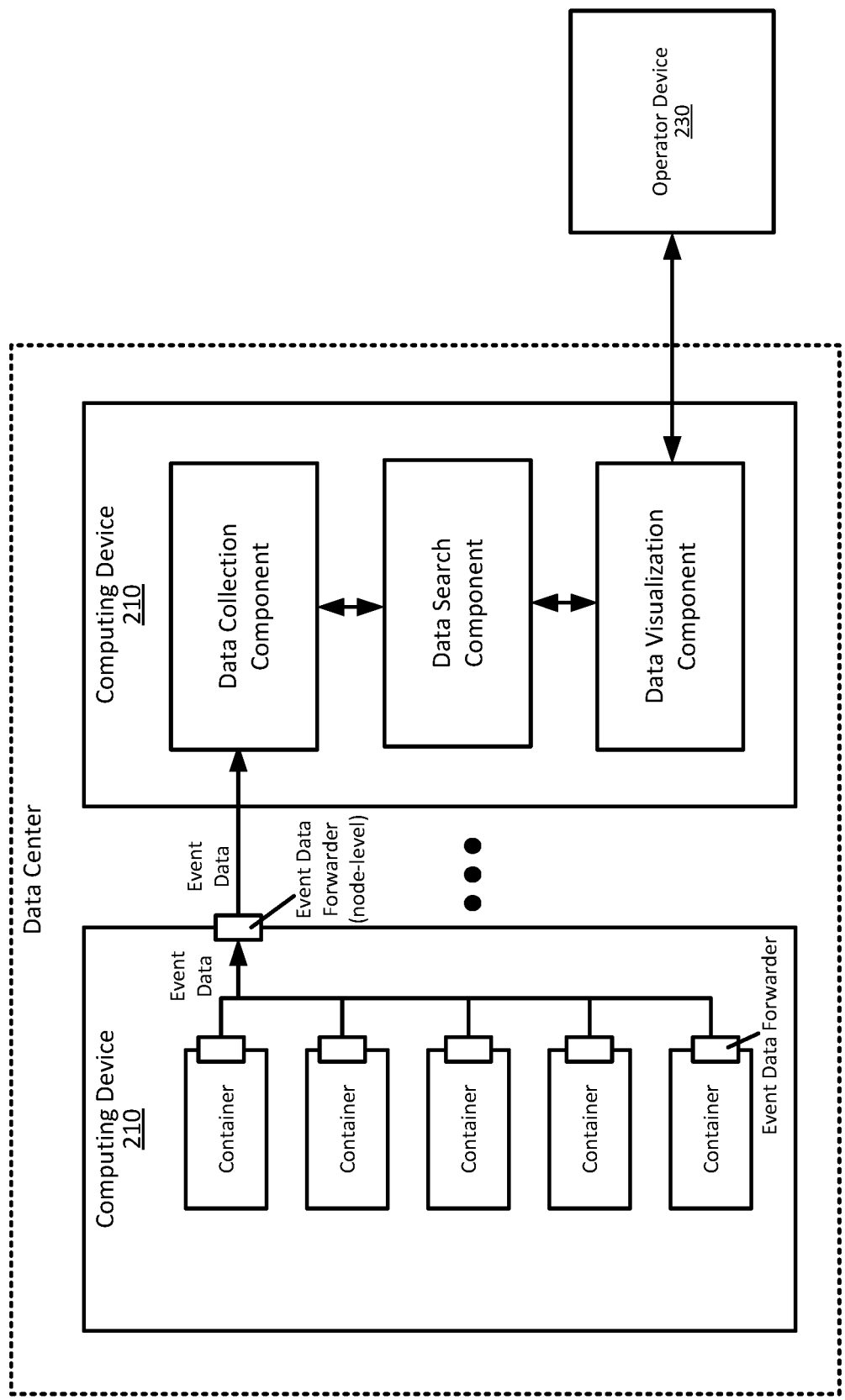
FIG. 7 is a diagram of an example implementation for creating records, and enabling visualization of, containers and container activity.

FIG. 7 is a diagram of an example implementation for creating records, and enabling visualization of, containers and container activity. As shown, computing devices 210 may host containers, a data collection component, a data search component, and a data visualization component. While the containers and components are illustrated of FIG. 7 as pertaining to particular computing devices 210, in some implementations, one or more of the containers and/or components may be distributed across multiple computing devices 210.

Each container may include an event data forwarder that may be a feature included in the container images used to create the containers. Computing device 210 may also include an event data forwarder operating on a node level. The event data forwarders of each container may provide event data to an event data forwarder at the node level, and the event data forwarder at the node level may provide the event data to the data collection component. Examples of event data may include descriptions of information sent or received by each application, operations performed by each application, changes to each application, a current status and configuration data of each application etc. In some implementations, an event data forwarder may be a Logstash forwarder and the data collection component may include an instance of Logstash.

The data collection component may process event data by parsing, filtering, and enriching collected data in any number of ways. For example, the data collection component may apply filters to collected data that may modify and annotate the data (e.g., to categorized the event data according the application/container corresponding to the data, the date and/or time in which the data was received, data corresponding to a particular type of event, etc.). The information collected and processed by the data collection component may be provided to the data search component.

The data search component may store all of the information (logs, events, files, etc.) received from the data collection component. The data search component may also include a search engine feature for the stored information. In some implementations, the data search component may include Elasticsearch. Additionally, the data search component may cooperate with the data visualization component in one or more ways, such as receiving and executing search queries from the data visualization component, and/or providing the query results to the data visualization component.

The data visualization component may include a centralized visualization tool for viewing service data, such as logs, events, etc. The data visualization component may enable an operator of operator device 230 to view the event information collected, processed and stored by computer devices 210. In some implementations, the data visualization component may provide an interface for defining filters, processing instructions, submitting queries, etc. Examples of search criteria may include a timestamp, an application identifier, a group identifier that corresponds to a group of applications, an IP address corresponding to computing device 210, a particular message or message type, a file name, etc. In some implementations, the data visualization component may include an instance of Kibana, which is discussed above with reference to FIG. 3.

Figure 8:
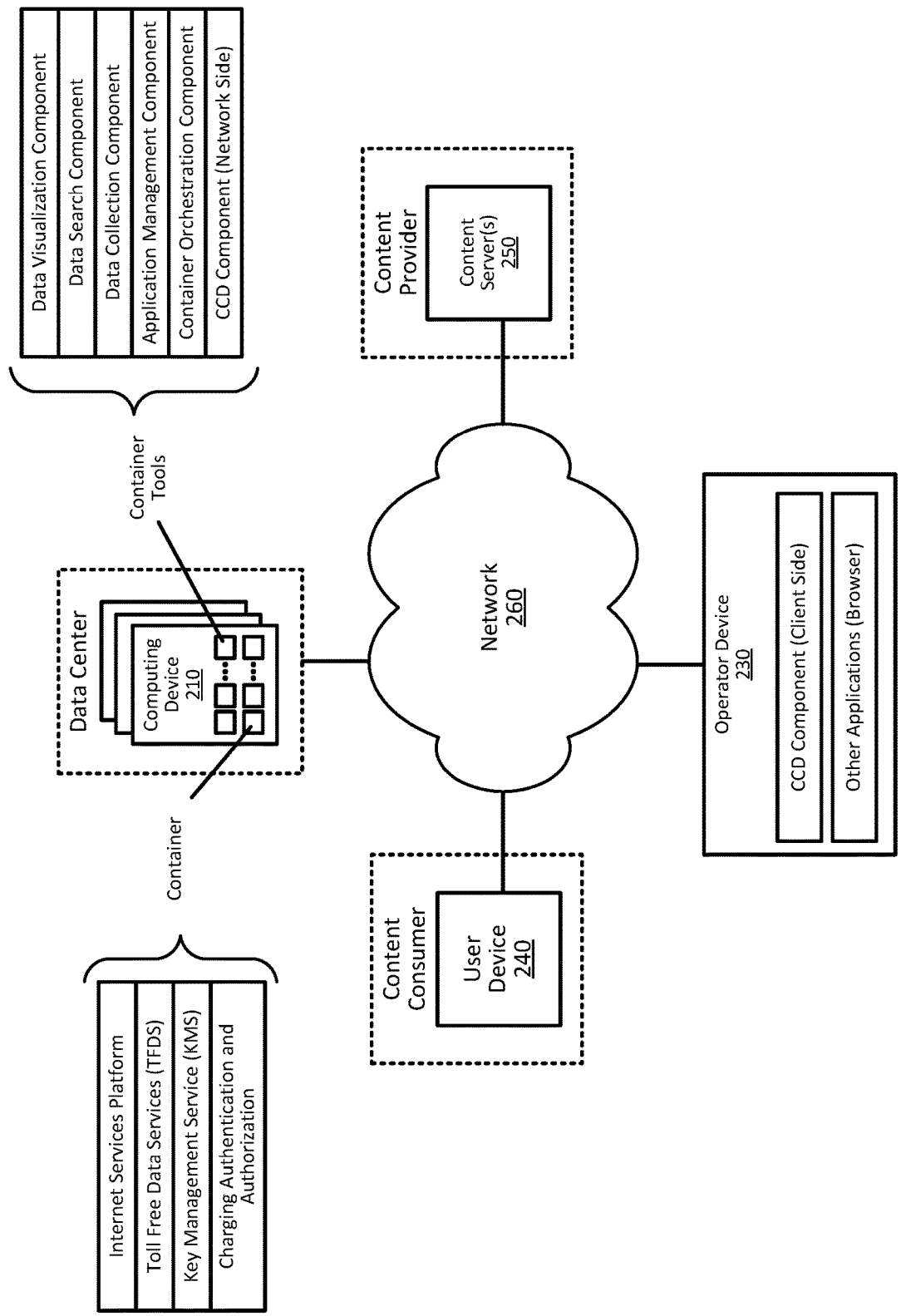
FIG. 8 is a diagram of an example implementation involving techniques, described herein, to provide key management services (KMS) for a toll free data service (TFDS)

FIG. 8 is a diagram of an example implementation involving techniques, described herein, to provide KMS for a TFDS. As shown, the example implementations may include computing device 210, operator device 230, user device 240, content server 250, and network 260. Examples of these devices are provided above with reference to FIG. 2.

As described above with reference to FIGS. 3 and 5, operator device 230 and computing device 210 may operate to create and test container images, in addition to using the container images to deploy containers. The container tools may enable the containers to discover and communicate with one another. Information representing the containers and activity associated with the containers may be collected, processed, stored, and indexed to create a repository of information that may be searched by, and presented to, an operator (via operator device 230).

The containers may provide one or more network services. For example, as shown in FIG. 8, the containers may provide an Internet services platform that may allocate network resources to different kinds of services provided via HTTP and HTTPS flows. In some implementations, the Internet service platform may include a large number of functions, operations, tools, features, etc., that may be implemented using hundreds or thousands of containers. The containers may be organized into different groups that may correspond to services that are a part of the Internet services platform. Examples of such services may include a TFDS where a content provider (as opposed to a content consumer) is to be charged for the network resources used to provide the content to the content consumer.

Similar to the Internet services platform, the TFDS may include functions, operations, tools, features, etc., that may be implemented as a large number of containers and groups of containers. An example of such a service may include a KMS. The KMS may responsible for managing key creation, key distribution, key storage, maintenance, and rotations. The keys of the KMS may also be used to sign the URIs of network resources (e.g., content) associated with the TFDS. In such a scenario, the key signatures on the URIs may be used to authenticate and authorize charges to the content provider in accordance with the TFDS.

As such, network services (such as an Internet service platform) may include hundreds or thousands of containers that may be organized into groups and subgroups, and that may interact at various times and in various ways. The techniques described herein may enable containers to be created, tested, and deployed in an efficient and effective manner. The techniques described herein may also enable the containers to discover and communicate with one another so that the containers may perform the portion of each network service to which they correspond. The techniques may also enable information of the containers (and the activity of the containers) to be automatically collected and presented to an operator in charge of ensuring that the network services (implemented by the containers) are operating as intended.

Figure 9:
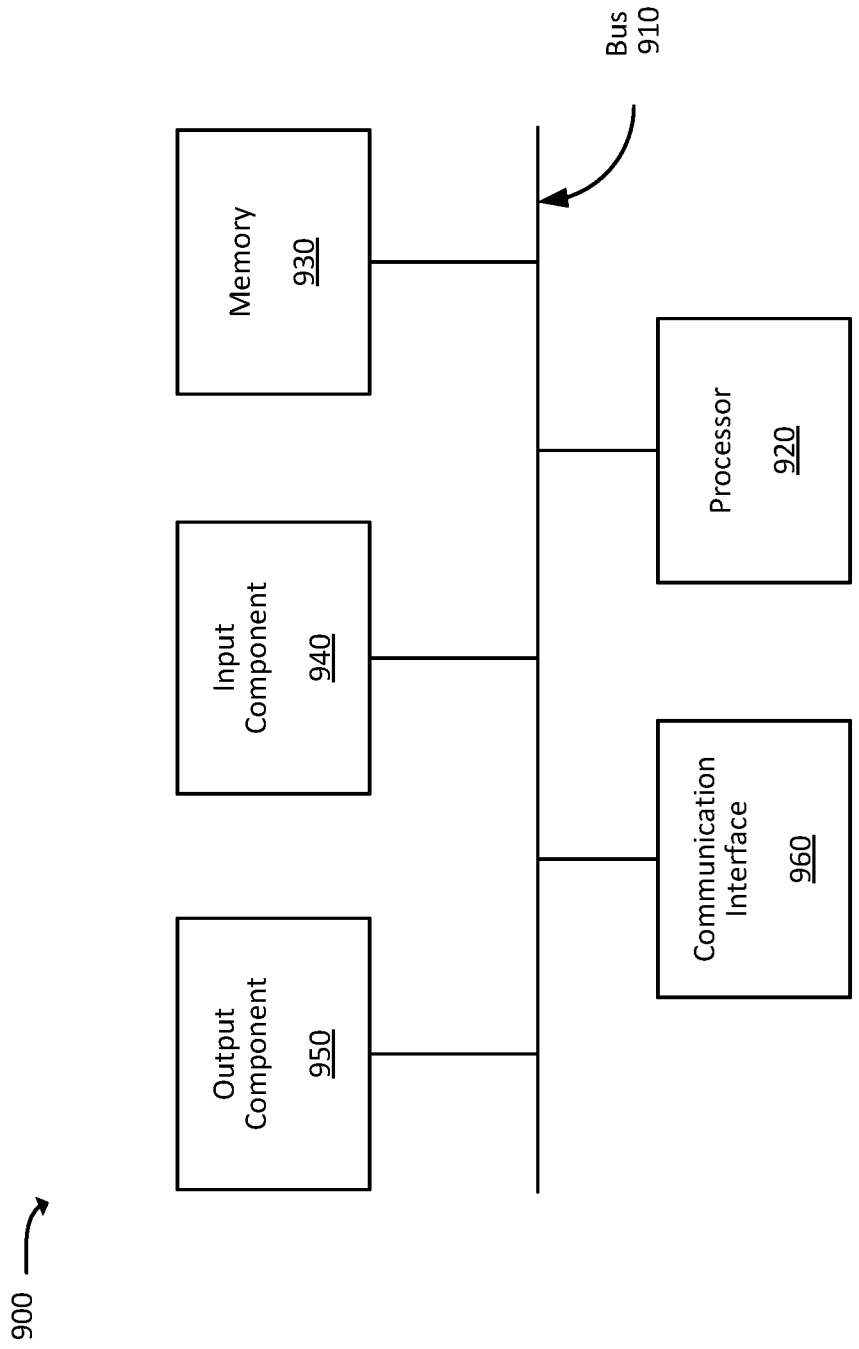
FIG. 9 is a block diagram of example components of a device.

FIG. 9 is a diagram of example components of a device 900. Each of the devices illustrated in FIGS. 1-3 and 5-8 may include one or more devices 900. Device 900 may include bus 910, processor 920, memory 930, input component 940, output component 950, and communication interface 960. In another implementation, device 900 may include additional, fewer, different, or differently arranged components. As described herein, a component may be implemented by circuitry, which may include hardware circuitry, software logic, and/or some combination thereof.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1, 4, 5, and 8 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. One or more computing devices comprising:
   a memory to store program instructions; and
   circuitry, to execute the program instructions to:
   receive, by one or more computing devices operating in a cloud computing environment, a container image from an operator device, the container image including a read-only data structure with instructions for creating a container, the container including a runtime environment for an application that corresponds to a network service to be provided by the one or more computing devices;
   deploy the container within the cloud computing environment by executing the container image;
   apply, to the container, a container naming and mapping technique applied to one or more other containers associated with the network service, the container naming and mapping technique enabling the container and the one or more other containers to automatically discover and begin communicating with one another in a manner that is consistent with providing the network service;
   collect information representing the deployment of the container and the one or more other containers, and information representing activity associated with the container and the one or more other containers, and
   provide, to the operator device, a visual representation of at least some of the information.

2. The one or more computing devices of claim 1, wherein, to deploy the container, the circuitry is to:
   receive, from the operator device, instructions regarding system resources, of the one or more computing devices, to be allocated to the container,
   receive a command, from the operator device, to deploy the container, and
   deploy, in response to the command, the container in accordance with the instructions for deploying the container.

3. The one or more computing devices of claim 1, wherein, to enable the container to communicate with the one or more other containers, the circuitry is to:
   map a port of the container to a port of the one or more computing devices, and
   map the port of the one or more computing devices to a service port that is consistent with the network service and used across the cloud computing environment.

4. The one or more computing devices of claim 1, wherein the circuitry is to:
deploy multiple instances of the container, and
load-balance the instances of the container among the one or more computing devices.

5. The one or more computing devices of claim 1, wherein the circuitry is to:
receive activity information, corresponding to the container and the one or more other containers, from event data forwarders included in each of the container and the one or more other containers.

6. The one or more computing devices of claim 1, wherein the circuitry is to provide the visualized representation in response to:
receiving a query, from the operator device, for information corresponding to the network service,
executing the query on the information representing the container and activity associated with the container, and
returning the at least some of the information in response to executing the query.

7. The one or more computing devices of claim 1, wherein:
the network service includes a toll free data service (TFDS) for charging a content provider, instead of a content consumer, for using a network to provide content to the content consumer, and
the container includes a key management service (KMS) of the TFDS, and
the KMS is to generate and distribute a security key for communications between the content provider and the content consumer.

8. The one or more computing devices of claim 7, wherein:
a universal resource identifier (URI) of the content is signed with the security key, and
the circuitry is to:
authenticate and authorize charging of the content provider for using the network to provide the content to the content consumer.

9. A method, comprising:
receiving, by one or more computing devices operating in a cloud computing environment, a container image from an operator device, the container image including a read-only data structure with instructions for creating a container, the container including a runtime environment for an application that corresponds to a network service to be provided by the one or more computing devices;
deploying, by the one or more computing devices, the container within the cloud computing environment by executing the container image;
applying, to the container, a container naming and mapping technique applied to one or more other containers associated with the network service, the container naming and mapping technique enabling the container and the one or more other containers to automatically discover and begin communicating with one another in a manner that is consistent with providing the network service,
collecting, by the one or more computing devices, information representing the deployment of the container and the one or more other containers, and information representing activity associated with the container and the one or more other containers, and
providing, by the one or more computing devices and to the operator device, a visual representation of at least some of the information.

10. The method of claim 9, wherein the deploying of the container includes:
receiving, from the operator device, instructions regarding system resources, of the one or more computing devices, to be allocated to the container,
receiving a command, from the operator device, to deploy the container, and
deploying, in response to the command, the container in accordance with the instructions for deploying the container.

11. The method of claim 9, wherein the enabling of the container to communicate with the one or more other containers includes:
mapping a port of the container to a port of the one or more computing devices, and
mapping the port of the one or more computing devices to a service port that is consistent with the network service and used across the cloud computing environment.

12. The method of claim 9, further comprising:
deploying multiple instances of the container, and
load-balancing the instances of the container among the one or more computing devices.

13. The method of claim 9, further comprising:
receiving activity information, corresponding to the container and the one or more other containers, from event data forwarders included in each of the container and the one or more other containers.

14. The method of claim 9, wherein the providing of the visualized representation is in response to:
receiving a query, from the operator device, for information corresponding to the network service,
executing the query on the information representing the deployment of the container and the one or more other containers and the information representing the activity associated with the container and the one or more other containers, and
returning the at least some of the information in response to executing the query.

15. The method of claim 9, wherein:
the network service includes a toll free data service (TFDS) for charging a content provider, instead of a content consumer, for using a network to provide content to the content consumer, and
the container includes a key management service (KMS) of the TFDS, and
the KMS is to generate and distribute a security key for communications between the content provider and the content consumer.

16. The method of claim 15, wherein:
a universal resource identifier (URI) of the content is signed with the security key, and
the method further comprises:
determining that the URI of the content is signed with the security key; and
authenticating and authorizing charging of the content provider for using the network to provide the content to the content consumer.

17. A non-transitory, computer readable medium storing a plurality of processor-executable instructions, wherein executing the processor-executable instructions causes one or more processors to:
receive, by one or more computing devices operating in a cloud computing environment, a container image from an operator device, the container image including a read-only data structure with instructions for creating a container, the container including a runtime environment for an application that corresponds to a network service to be provided by the one or more computing devices;

deploy the container within the cloud computing environment by executing the container image;

apply, to the container, a container naming and mapping technique applied to one or more other containers associated with the network service, the container naming and mapping technique enabling the container and the one or more other containers to automatically discover and begin communicating with one another in a manner that is consistent with providing the network service, collect information representing the deployment of the container and the one or more other containers, and information representing activity associated with the container and the one or more other containers, and provide, to the operator device, a visual representation of at least some of the information.

18. The non-transitory memory device of claim 17, wherein, to deploy the container, the processor-executable instructions causes the one or more processors to:

receive, from the operator device, instructions regarding system resources, of the one or more computing devices, to be allocated to the container, receive a command, from the operator device, to deploy the container, and deploy, in response to the command, the container in accordance with the instructions for deploying the container.

19. The non-transitory memory device of claim 17, wherein, to enable the container to communicate with the one or more other containers, the processor-executable instructions causes the one or more processors to:

map a port of the container to a port of the one or more computing devices, and map the port of the one or more computing devices to a service port that is consistent with the network service and used across the cloud computing environment.

20. The non-transitory memory device of claim 17, wherein the processor-executable instructions causes the one or more processors to:

receive activity information, corresponding to the container and the one or more other containers, from event data forwarders included in each of the container and the one or more other containers.

* * * * *